(12) United States Patent
Parsian et al.

(10) Patent No.: US 10,270,894 B2
(45) Date of Patent: *Apr. 23, 2019

(54) ONE-TOUCH GROUP COMMUNICATION DEVICE CONTROL

(71) Applicant: Orion Labs, San Francisco, CA (US)

(72) Inventors: Mohammadali Parsian, Walnut Creek, CA (US); Greg Albrecht, San Francisco, CA (US); Jesse Robbins, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,869

(22) Filed: Jul. 17, 2018

(65) Prior Publication Data

US 2018/0324285 A1 Nov. 8, 2018

Related U.S. Application Data

(63) Continuation of application No. 15/487,253, filed on Apr. 13, 2017, now Pat. No. 10,057,394.

(60) Provisional application No. 62/321,798, filed on Apr. 13, 2016.

(51) Int. Cl.
*H04M 1/02* (2006.01)
*H04M 1/05* (2006.01)
*H04M 1/725* (2006.01)

(52) U.S. Cl.
CPC .......... *H04M 1/0241* (2013.01); *H04M 1/05* (2013.01); *H04M 1/0225* (2013.01); *H04M 1/7253* (2013.01); *H04M 2201/38* (2013.01)

(58) Field of Classification Search
None
See application file for complete search history.

(56) References Cited

U.S. PATENT DOCUMENTS

| 4,993,280 | A | | 2/1991 | Olkoski et al. | |
|---|---|---|---|---|---|
| 6,128,514 | A | * | 10/2000 | Griffith | H04M 1/0216 455/564 |
| 2002/0161585 | A1 | | 10/2002 | Gabel | |
| 2003/0013417 | A1 | * | 1/2003 | Bum | G06F 1/1616 455/575.1 |
| 2005/0148375 | A1 | * | 7/2005 | DeLine | G06F 1/1616 455/575.3 |
| 2006/0146724 | A1 | | 7/2006 | Ahya et al. | |
| 2006/0155391 | A1 | * | 7/2006 | Pistemaa | H04M 1/0214 700/17 |
| 2007/0080814 | A1 | | 4/2007 | Ellsworth et al. | |
| 2009/0131019 | A1 | * | 5/2009 | Natsuno | H04W 88/00 455/411 |
| 2011/0240455 | A1 | | 10/2011 | Kulczycki et al. | |

(Continued)

*Primary Examiner* — Mohammed Rachedine

(57) ABSTRACT

One-touch transmission and one-touch silencing of a wearable group communication device utilize an end user device body and face that can be moved relative to one another in one or more simple, single-motion actions. One-touch audio transmission is enabled after an end user device is activated to enable communications. Depressing the end user device face relative to the end user device body enables audio transmission. While the face is in its depressed position audio can be transmitted. To cease audio transmission the face is released. One-touch audio silencing of an activated end user device can be performed by rotating the face relative to the body to silence audio broadcast.

16 Claims, 10 Drawing Sheets

(56) References Cited

U.S. PATENT DOCUMENTS

2012/0092245 A1* 4/2012 Griffin .................. G06F 1/1677
345/156
2012/0298494 A1 11/2012 Mahida et al.

* cited by examiner

ONE-TOUCH GROUP COMMUNICATION DEVICE CONTROL

RELATED APPLICATIONS

This application is a continuation of U.S. patent application Ser. No. 15/487,253, filed on Apr. 13, 2017, entitled "ONE-TOUCH GROUP COMMUNICATION DEVICE CONTROL," which claims the benefit of and priority to U.S. Provisional Patent Application No. 62/321,798, entitled "ONE-TOUCH GROUP COMMUNICATION DEVICE CONTROL," filed 13 Apr. 2016. Each patent application identified above (including any appendices thereto) is incorporated herein by reference in its entirety for all purposes.

TECHNICAL FIELD

Aspects of the disclosure are related to communications and, in particular, to end user devices and applications for efficient communications.

TECHNICAL BACKGROUND

Various devices permit linking one communication device to another to permit communications between the devices. In some communication systems, an endpoint device in a communication system can be an end user device that allows a user to communicate with other endpoint devices (e.g., in some systems via one or more intermediate communication devices and a communication network or the like). For example, a wearable end user device can be linked to an intermediate communication device (e.g., a cellphone, smartphone, gaming device, tablet, laptop) that in turn is connected to a communication network that permits a user of the end user device to communicate verbally or otherwise with other devices connected to the network. When a user is wearing an end user device it can be inconvenient, and in some case, dangerous to require the user to perform multiple steps to transmit audio and/or to silence the end user device. Some communication devices require a user to perform multiple steps with a graphical user interface or other user interface that may not be practical or even possible for a user to perform in some settings.

As a result, it would be advantageous to facilitate enabling audio transmission and to facilitate end user device silencing using one-touch transmission and one-touch silencing in a manner that is simple and reliable for users and that assists the user in operating the end user device.

OVERVIEW

Implementations of one-touch transmission and one-touch silencing of a wearable group communication device utilize an end user device body and face that can be moved relative to one another in one or more simple actions. One-touch audio transmission is enabled after an end user device is activated to enable communications (e.g., with other end user devices in a group in one non-limiting example). Depressing a face of the end user device relative to the end user device's body enables audio transmission. While the face is in its depressed position audio can be transmitted. To cease audio transmission the face is released. One-touch audio silencing of an activated end user device can be performed by rotating the face relative to the body to silence audio broadcast. Some implementations provide a simple activation/silencing function and talk/no-talk function using one linear displacement axis of motion of the face relative to the body and one rotational displacement axis of motion of the face relative to the body. In some implementations the linear displacement axis and rotational displacement axis can be the same axis.

This Overview is provided to introduce a selection of concepts in a simplified form that are further described below in the Technical Disclosure. It may be understood that this Overview is not intended to identify or emphasize key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
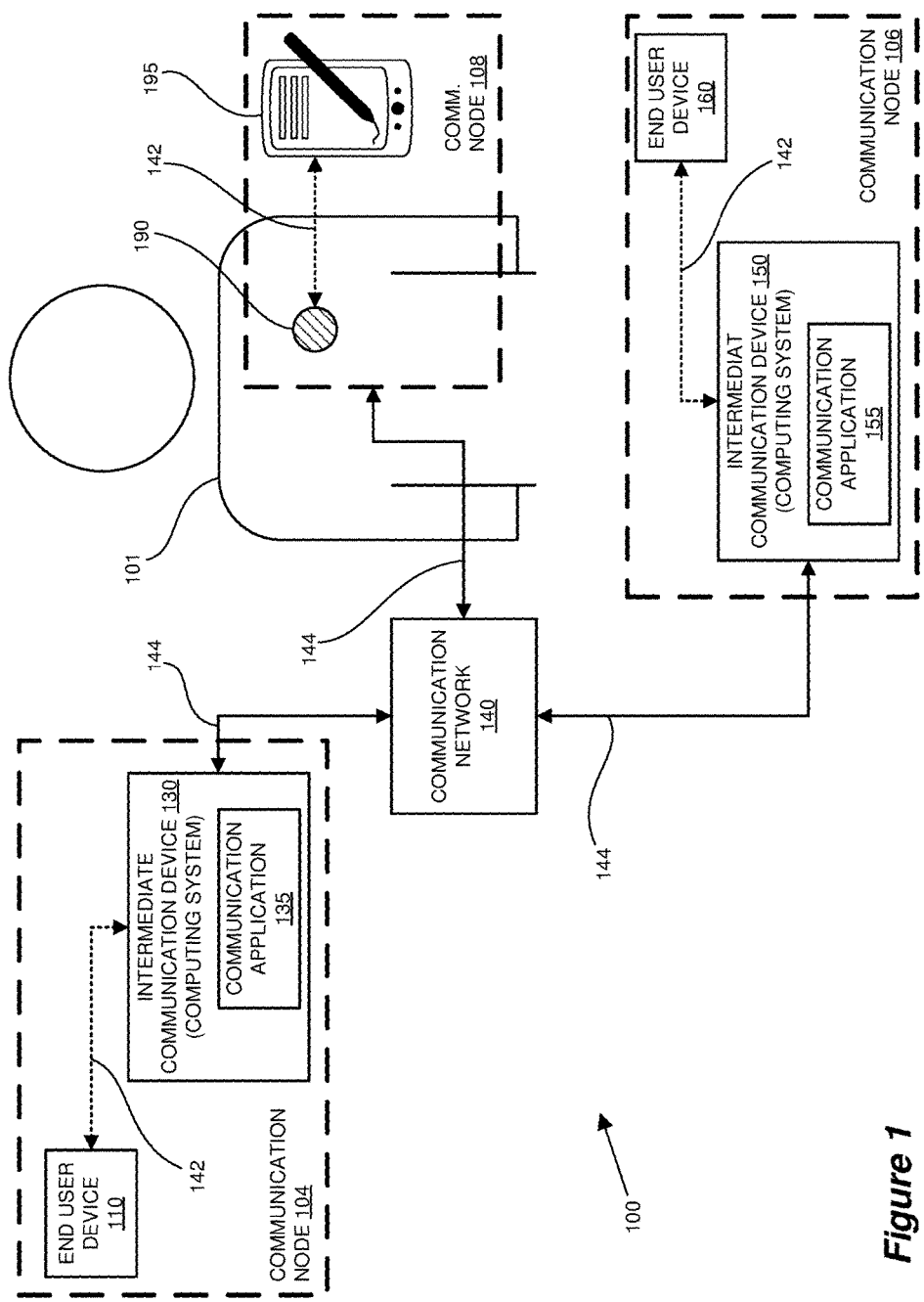
FIG. 1 illustrates one or more exemplary systems configured to facilitate communications between end user devices.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some implementations of one-touch transmission and one-touch silencing are used in a communication system that allows wearable group communication end user devices to communicate with one another via their respective intermediate communication devices and a communication network. Such systems connect each end user device to its associated intermediate communication device. Each such intermediate communication device is connected to a network that then allows communications between and among members of a group that is made up of two or more end user devices.

Unlike prior communication devices such as cellphones, smartphones, gaming devices, tablets, laptops and the like that require multiple-step interaction between a user and the communication device to either enable transmission of audio from a user (e.g., capturing and/or collecting acoustic signals such as speaking) and that require multiple-step interaction between the user and the communication device to silence the communication device, implementations of one-touch transmission and one-touch silencing only require a single gesture or other motion by the user. In some implementations one-touch transmission is enabled by depressing a communication device face during transmission. In some implementations one-touch silencing is enabled by rotating the communication device face to silence the communication device. In some implementations using simple one-touch functions acting on different axes of motion (e.g., a linear motion axis between an end user device face and body and a rotational motion axis between an end user device face and body), the one-touch silencing and one-touch transmission functions can be combined in a single end user device. In some implementations the linear axis of motion and rotational axis of motion can be the same axis (e.g., being collinear, for example where axis 124C and axis 126A/B are the same or collinear using the implementation of end user device 190 in FIGS. 2A-2D). This simple user interface with a communication device also makes the device safer to use in many settings and adaptable for use in settings in which a more complex user interface would make a communication device impractical. In some implementations a user will know that a linear displacement of the end user device face relative to the device's body will enable talking or other audio transmission while rotational displacement of the face relative to the body can be use to activate (i.e., enable audio transmission) and silence the device (e.g., disabling a speaker or the like on the end user device).

FIG. 1 illustrates one or more implementations of a communication system 100 configured to facilitate, among other things, audio communications between endpoint devices on a communications network. System 100 includes communication node 104 (which includes endpoint end user device 110 and its linked intermediate communication device 130 (also referred to as a computing system)), communication node 106 (which includes endpoint end user device 160 and its linked intermediate communication device 150 (also referred to as a computing system)), and communication network 140 linking nodes 104, 106. An additional communication node 108 (associated with a user 101), comprising an end user device 190 coupled to an intermediate communication device 195, also is shown connected to network 140. As will be appreciated by those skilled in the art, additional nodes, endpoint devices, end user devices and intermediate communication devices can be interconnected via communication network 140.

Intermediate communication device 130 (also referred to as an "ICD," which can be a computing system such as a cellphone, smartphone, gaming device, tablet or laptop) in communication node 104 communicates with its associated end user device 110 over a communication link 142 (e.g., Bluetooth or Bluetooth low energy), and further communicates outside node 104 using communication network 140 over one or more communication network links 144. ICD 150 (which can be a computing system such as a cellphone, smartphone, gaming device, tablet or laptop) in communication node 106 also communicates with its associated end user device 160 using a communication link 142, and further communicates outside node 106 using communication network 140 over communication network link 144. ICD 195 (which can be a computing system such as a cellphone, smartphone, gaming device, tablet or laptop) in communication node 108 also communicates with its associated end user device 190 using a communication link 142, and further communicates outside node 108 using communication network 140 over communication network link 144.

Links 142 can be used to link an end user device with its associated intermediate communication device using communication linking. The communication link 144 that connects intermediate communication device 130 to communication network 140 can use one or more of Time Division Multiplexing (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Links 144 connecting intermediate communication devices 150, 195 to network 140 operate similarly. Communication links 144 each use metal, glass, optical, air, space, or some other material as the transport media and may each be a direct link, or can include intermediate networks, systems (including one or more management service systems), or devices, and can include a logical network link transported over multiple physical links.

Each ICD 130, 150, 195 may comprise a cellphone, smartphone, gaming device, tablet, computer, or some other computing system capable of running a communication application and communicating with communications network 140 using the Internet or some other widespread communication network. Each of ICDs 130, 150 includes at least one user interface that allows a user to enter data and interact with communication application 135, 155, respectively. ICD 195 operates similarly, though its communication application is not shown in FIG. 1. When transmitting and receiving data, ICDs 130, 150, 195 and the like can use an appropriate data transfer scheme (including, but not limited to encryption, for example).

Communications network 140 can comprise a server system utilizing one or more computing devices capable of providing communication services to a plurality of communication nodes and their respective endpoint devices, such as end user devices 110, 160, 190. End user devices 110, 160, 190 (also referred to as "EUDs" and/or computing systems) may each comprise a speaker, microphone, processing system, communication interface, and a user interface to exchange communications with ICDs 130, 150, 195, respectively, and thus with communications network 140 and other endpoint devices of various types.

Figure 2A:
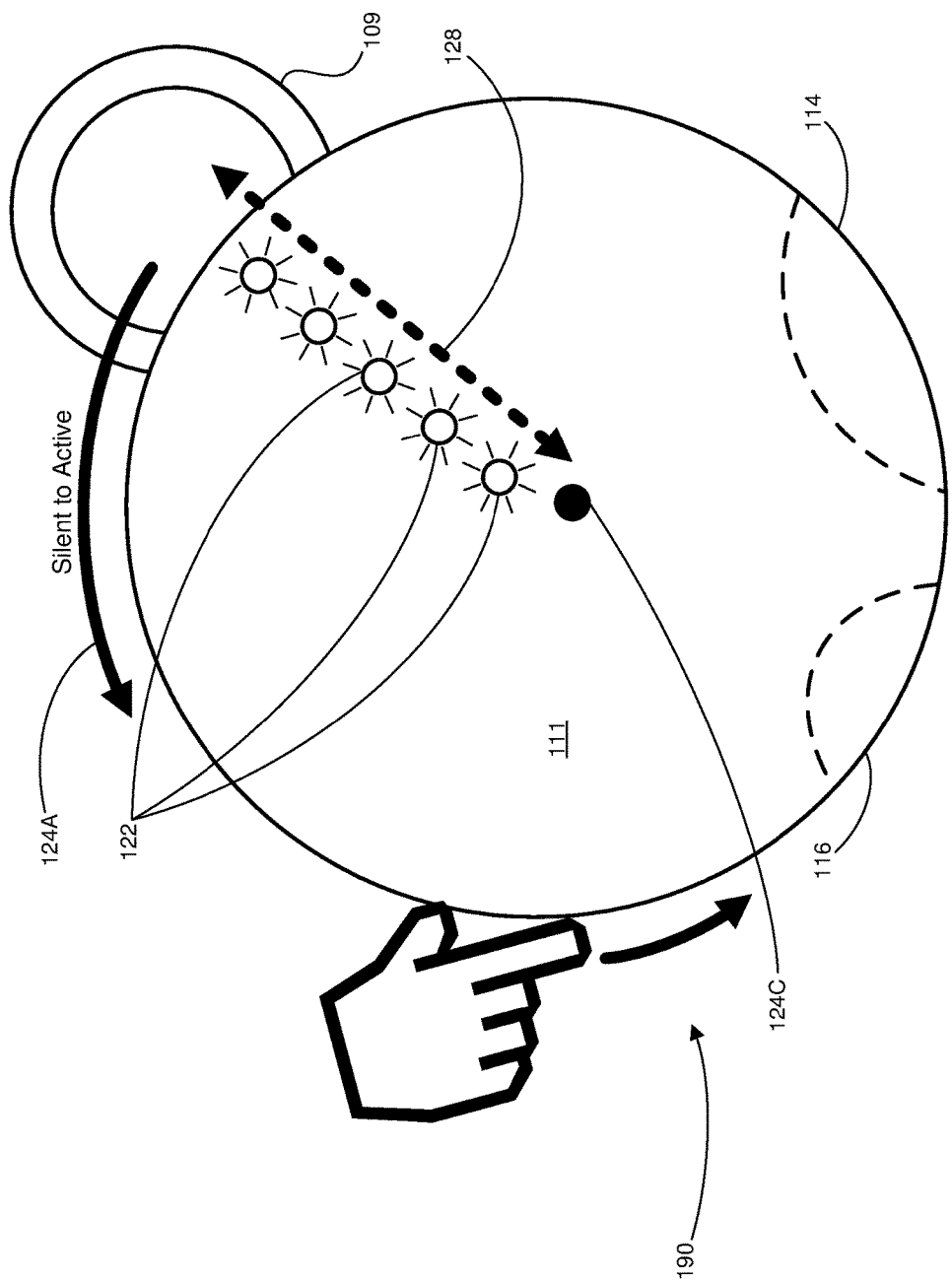
FIG. 2A is a top view of an end user device configured to implement one-touch transmission and/or one-touch silencing of the end user device.
Figure 2B:
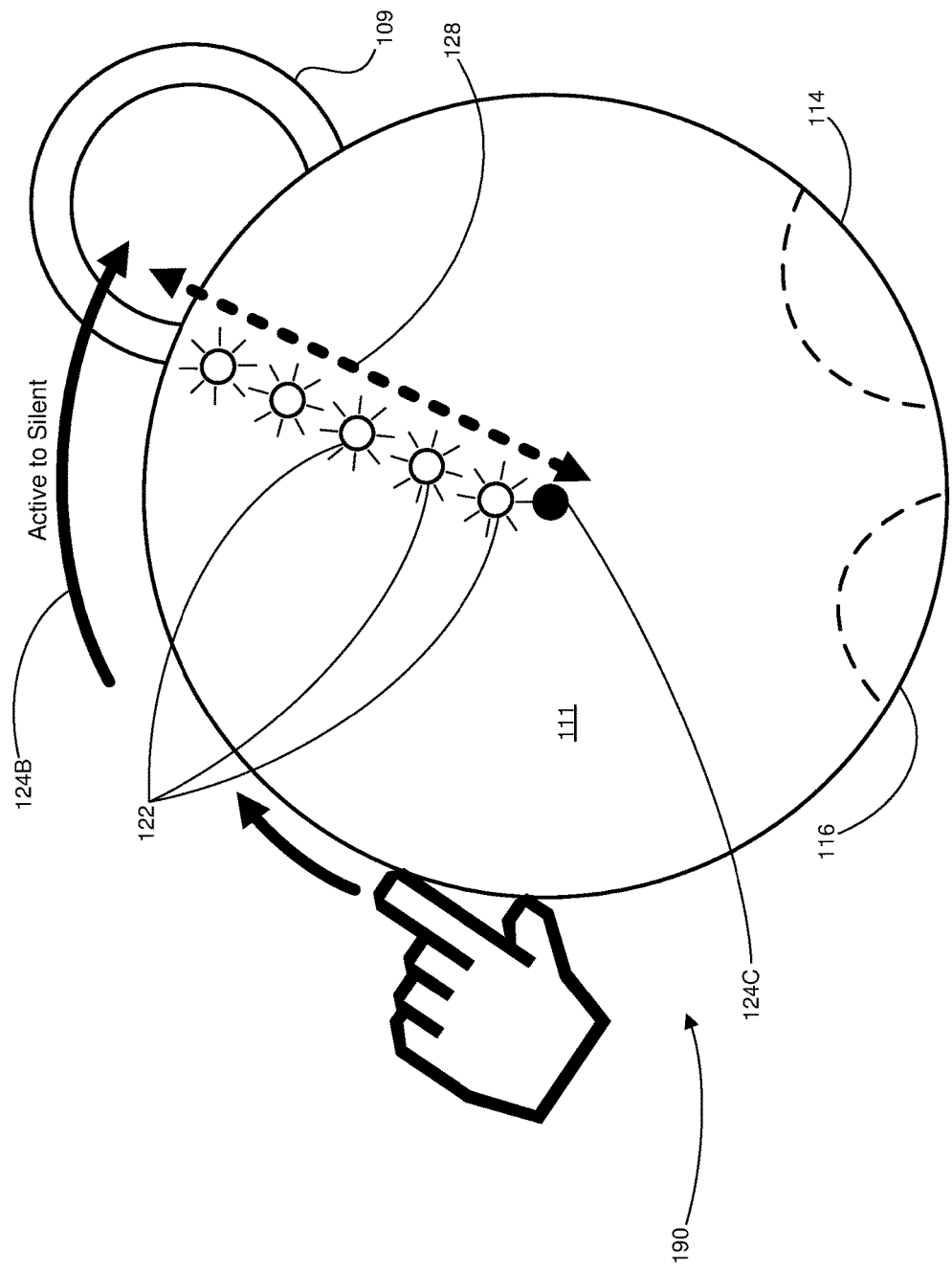
FIG. 2B is a top view of an end user device configured to implement one-touch transmission and/or one-touch silencing of the end user device.
Figure 2C:
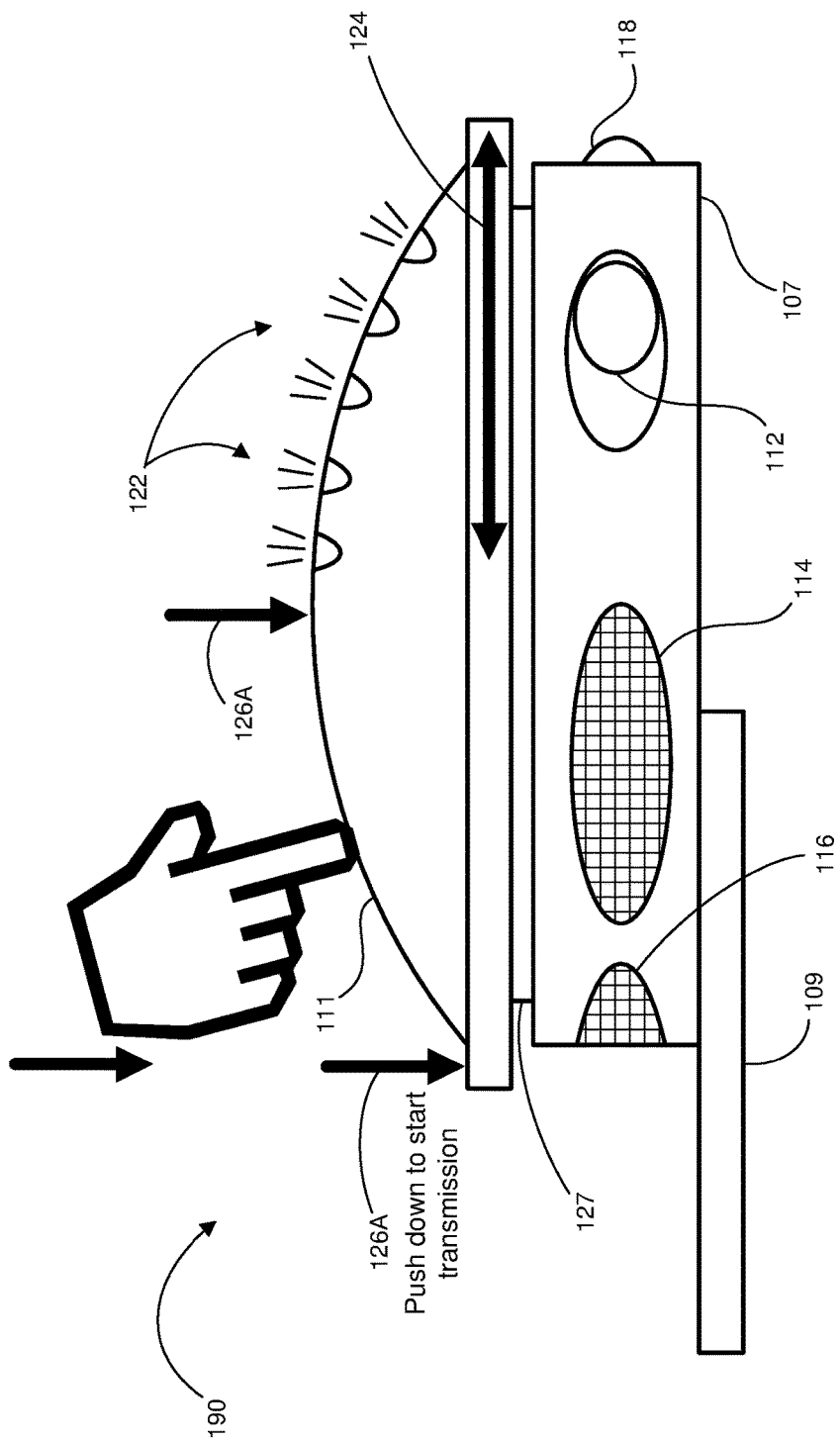
FIG. 2C is a side view of an end user device configured to implement one-touch transmission and/or one-touch silencing of the end user device.
Figure 2D:
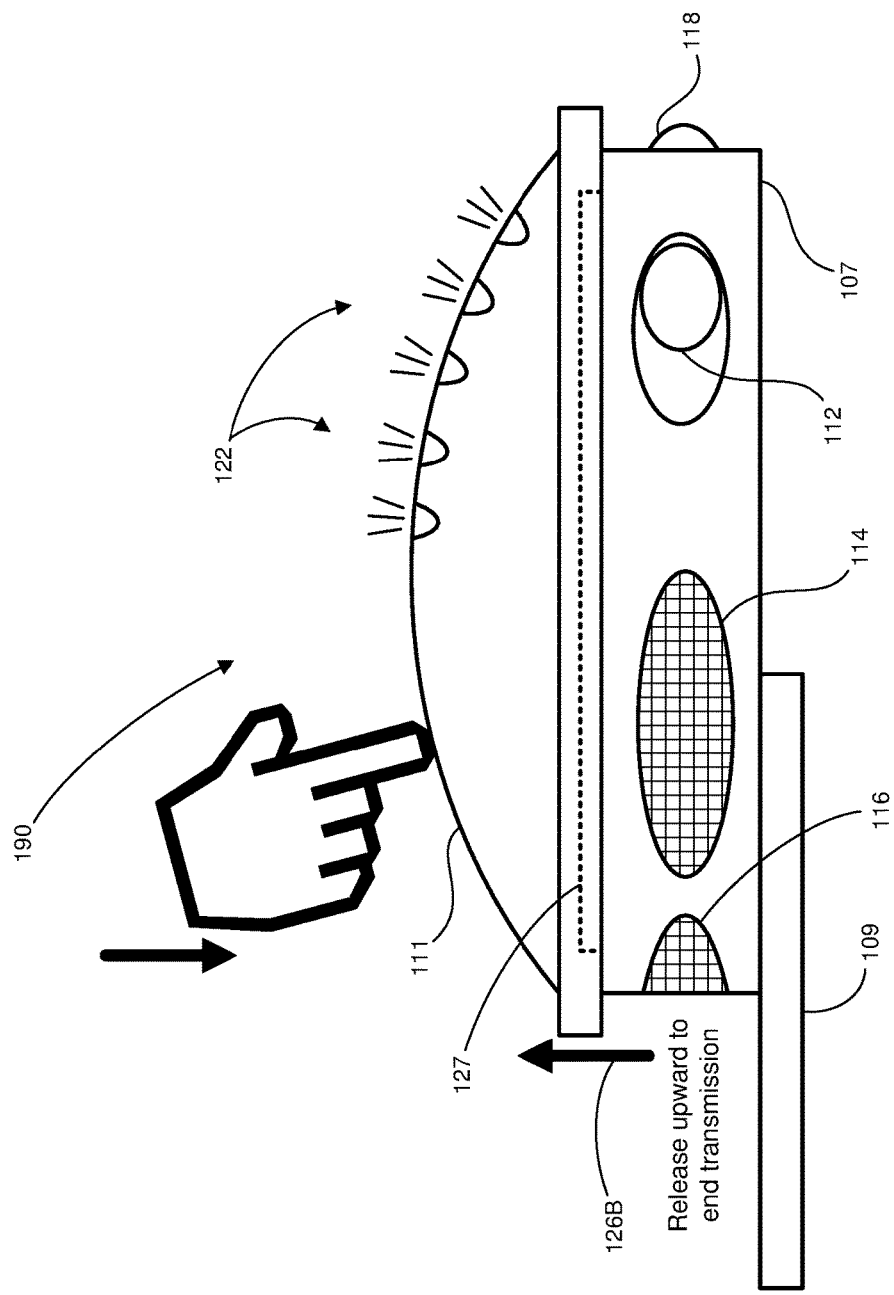
FIG. 2D is a side view of an end user device configured to implement one-touch transmission and/or one-touch silencing of the end user device.

The endpoint devices of network 140 include EUDs 110, 160, 195, each of which can be a highly portable (e.g., wearable) communication device. One non-limiting example of EUD device 190 is shown in FIGS. 2A-2D. Device 190 has a face 111 that can be generally circular in shape, as shown in FIG. 2A, or can be any other shape. In the non-limiting example of FIGS. 2A-2D, end user device 190 uses the generally circular shape to facilitate certain operations and to permit the positioning of certain functions and components, which also can be performed and implemented in alternative ways in other configurations. Device 190 includes a generally cylindrical body 107 and face 111 can be slightly convex (e.g., having a quasi-conical shape or a cup-like shape). Because of the simplified controls disclosed herein, device 190 can be smaller and more compact than earlier personal communication devices. For example, device 190 can have a diameter of between 1 and 3 inches and be 0.5 to 1 inch thick, making wearing or otherwise attaching device 190 to a user 101 or user's personal accessory (e.g., a backpack strap) easier, in addition to simplifying the device's operation.

Body 107 has an attachment mechanism 109 (e.g., a clip or clasp) mounted thereon to permit attachment of device 190 to clothing, a backpack, a bag strap or another personal item that facilitates a user's conversation with other users while wearing device 190. Various functional components of EUD 190 can be situated around the periphery of body 107, as seen in FIGS. 2A-2D. A master power switch 112 can turn device 190 master power on and off (as distinguished from silencing device 190 and/or enabling sound transmission by device 190, as discussed herein). A speaker 114 is built in to body 107, as is a microphone 116, each of a type and size that again facilitates and enables conversation by a user wearing device 190. A volume control 118 permits adjustment of the sound level generated by speaker 114 (e.g., lowering sound level by depressing one end—such as the "−" end—of control 118 and increasing sound level by depressing another end—such as the "+" end). Other components and/or features (e.g., a micro and/or other Universal Serial Bus (USB) port, charging port and/or headphone jack) can also be positioned around the periphery of device 190.

Face 111 (which also can be considered and/or referred to as a cover) can be made of plastic or any other suitable material(s) and includes an optical display 122 which in FIGS. 2A-2D is an LED or other light array. In other implementations, the optical display on face 111 can be a sticker, label or decal applied to face 111. LED array 122 operates as described in various implementations of one-touch silencing and one-touch transmission discussed herein. Face 111 is attached to body 107 in a manner that permits limited rotation of face 111 relative to body 107, as referenced by arrow 124 in FIGS. 2A-2D (e.g., using a cylindrical mounting member 127 or the like). Likewise, face 111 is mounted to body 107 in a depressible configuration that permits limited displacement and depression of face 111 relative to body 107, as referenced by arrow 126 in FIGS. 2A-2D (e.g., again using cylindrical mounting member 127 or the like).

In operation in some implementations, including one or more illustrated in FIGS. 1 and 2A-2D, the master device power is turned on for EUD 190 (e.g., using master power switch 112). Initially the optical display 122 is in the position shown in FIG. 2A. In the non-limiting example of FIG. 2A, this has the linear LED array 122 pointing generally toward the center of loop 109 as a housing marker (although any external marker on body 107 can be used for convenience, such as a power control button, headphones jack or easily-viewable marking). When a user wishes to use device 190 for communicating (e.g., via an intermediate communication device 195 of FIG. 1 in one non-limiting example), face 111 is rotated about axis 124C as indicated by arrow 124A relative to body 107 (e.g., from the position illustrated in FIG. 2A to the position illustrated in FIG. 2B, pointing the LED array 122 toward a second housing marker such as one end of loop 109) which puts EUD 190 in its "active" mode. Optical display 122 can be used to confirm successful switching to the active mode (e.g., by providing a single-color LED animation in one non-limiting example). Once the user knows that EUD 190 is in active mode, selective audio transmission can begin. Initially the face 111 is in the position illustrated in FIG. 2C. Face 111 is depressed downward relative to body 107 as indicated by arrows 126A. When face 111 is in its depressed position (illustrated in the non-limiting example of FIG. 2D), EUD 190 is in "transmit" mode so that acoustic signals picked up by microphone 116 are transmitted from EUD 190 to other users (e.g., using intermediate communication devices 130, 150 and network 140 in FIG. 1 in one non-limiting example). When the face 111 returns to its raised position relative to body 107 as indicated by arrow 126B of FIG. 2D, audio transmission by EUD 190 ceases (e.g., by ceasing the collection of audio data by EUD 190).

If during use a user wants to silence EUD 190, then one-touch silencing can be implemented by rotating face 111 relative to body 107. In one non-limiting example this is done by reversing the rotation noted above with regard to FIGS. 2A and 2B, so that the optical display 122 moves clockwise from the position illustrated in FIG. 2B to the position illustrated in FIG. 2A, for example as illustrated by arrow 124B and axis 124C of FIG. 2B. Again, when an LED or other light or array is used, display 122 can confirm successful switching to the silent mode (e.g., by providing a single-color LED animation in one non-limiting example, here having the color differing from that used to indicate successful activation).

Figure 3:
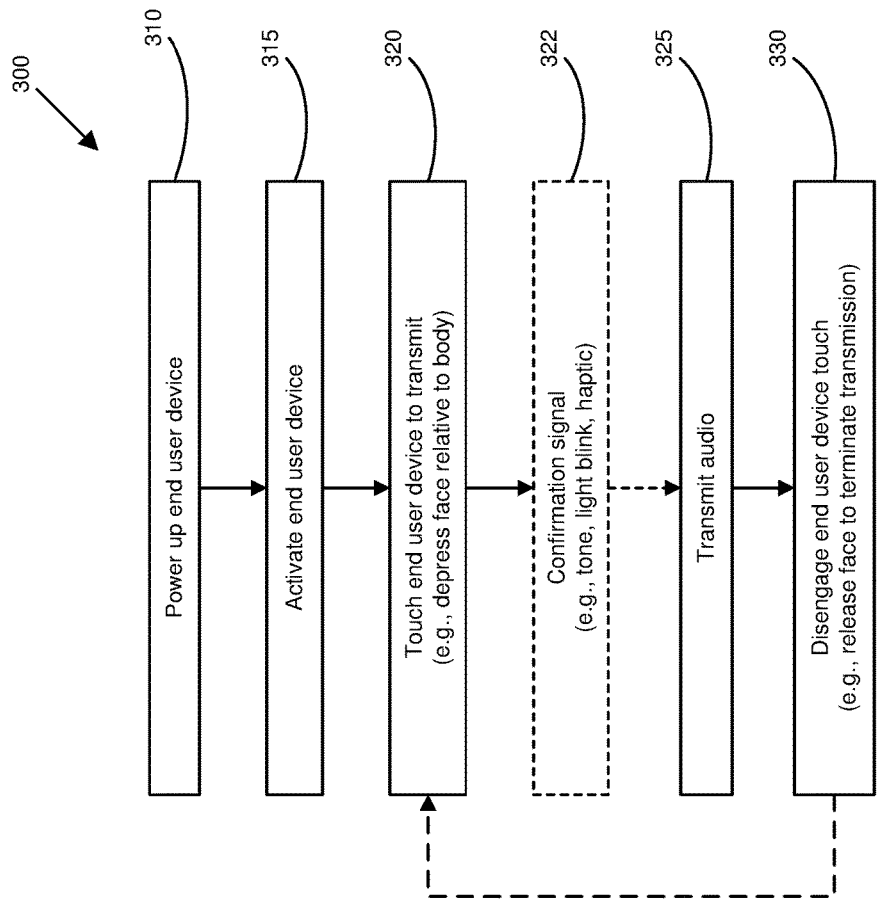
FIG. 3 illustrates one or more methods of operating a communication system.

Referring to FIG. 3, a method 300 of one-touch audio transmission is shown, for example using an end user device such as EUD 190 of FIGS. 1 and 2A-2D in one non-limiting example. The description below references operations of FIG. 3 parenthetically. As described in connection with FIGS. 1 and 2A-2D, an EUD 190 can be powered up (310). The EUD 190 is then activated (315) to enable communications (e.g., with other end user devices in a group in one non-limiting example). Activation can be accomplished in some implementations using a single rotational motion, as described herein. Depressing face 111 relative to body 107 initiates audio transmission (320). In some implementations a confirmation signal (e.g., an audio tone, a blinking light, haptic vibration) can be generated (322) by device 190 to let the user know that audio transmission is activated and that voice and other sound is now being transmitted to other users. While the face 111 is in its depressed position audio is transmitted (325). To cease audio transmission the face 111 is released (330). Optionally method 300 can return to step (320) to re-initiate audio transmissions if desired. While the face is in its raised position, the EUD may be in a receive mode to permit receipt of incoming audio data from other EUDs in a communication group to which EUD 190 belongs.

Figure 4:
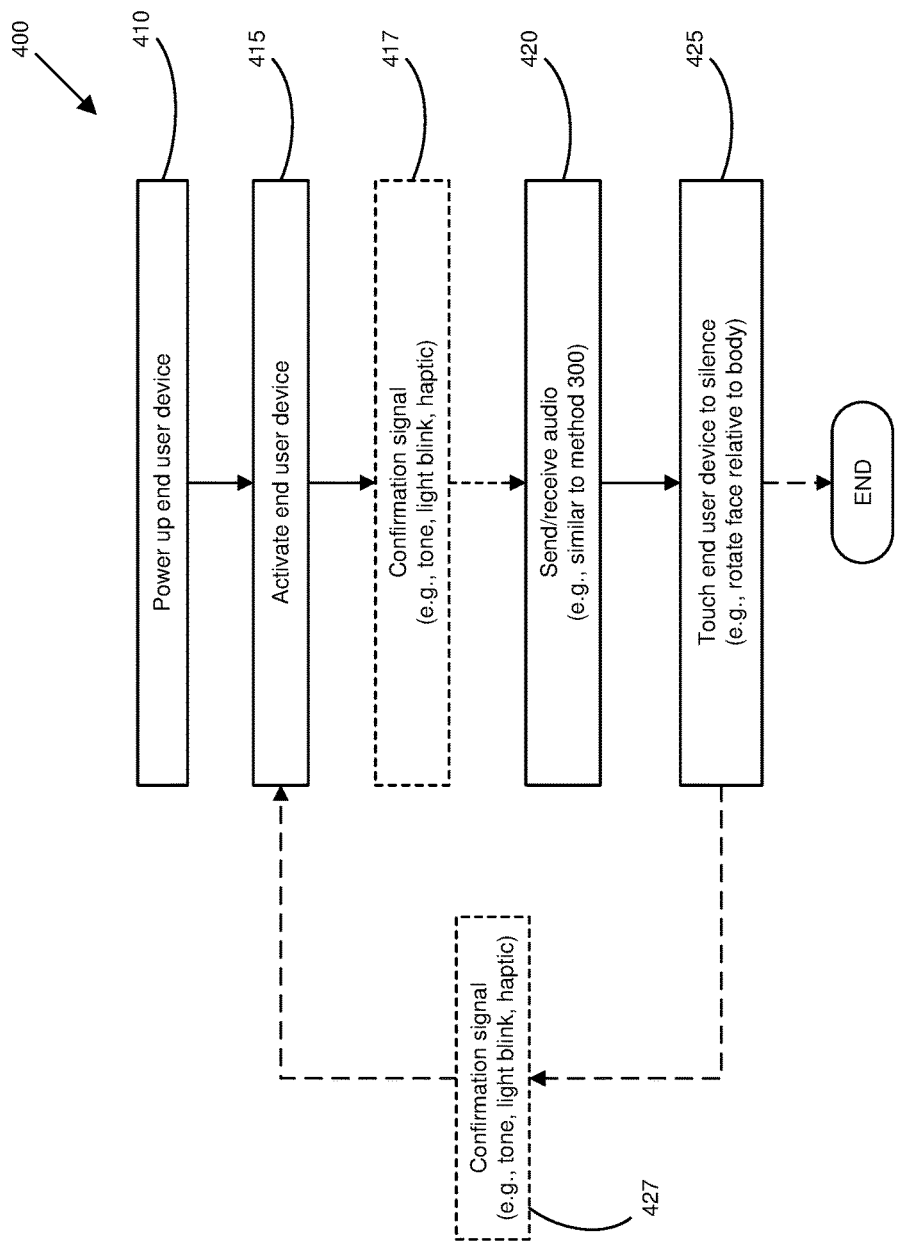
FIG. 4 illustrates one or more methods of operating a communication system.

Referring to FIG. 4, a method 400 of one-touch audio silencing is shown, for example using an end user device such as EUD 190 of FIGS. 1 and 2A-2D in one non-limiting example. The description below references operations of FIG. 4 parenthetically. As described in connection with FIGS. 1 and 2A-2D, an EUD 190 can be powered up (410). The EUD 190 is then activated (415) to enable communications (e.g., with other end user devices in a group in one non-limiting example). Activation can be accomplished in some implementations using a single rotational motion, as described herein. In some implementations a confirmation signal (e.g., an audio tone, a blinking light, haptic vibration) can be generated (417) by device 190 to let the user know that EUD 190 is active. Audio communications may then be sent and/or received (420). To silence the EUD 190, face 111 is rotated (425) relative to body 107. In some implementations a silencing confirmation signal (e.g., an audio tone, a blinking light, haptic vibration) can be generated (427) by device 190 to let the user know that audio broadcast has been silenced. Audio broadcast can optionally be re-enabled (415)

by again activating EUD 190 by rotating face 111. When silenced, the EUD 190 can generate a haptic signal through the body 107 and/or face 111 or can generate a (blinking) light pulsation signal (e.g., via an LED array 122) in lieu of audio broadcast, thus allowing a user to know when another group member is transmitting audio data.

Figure 5:
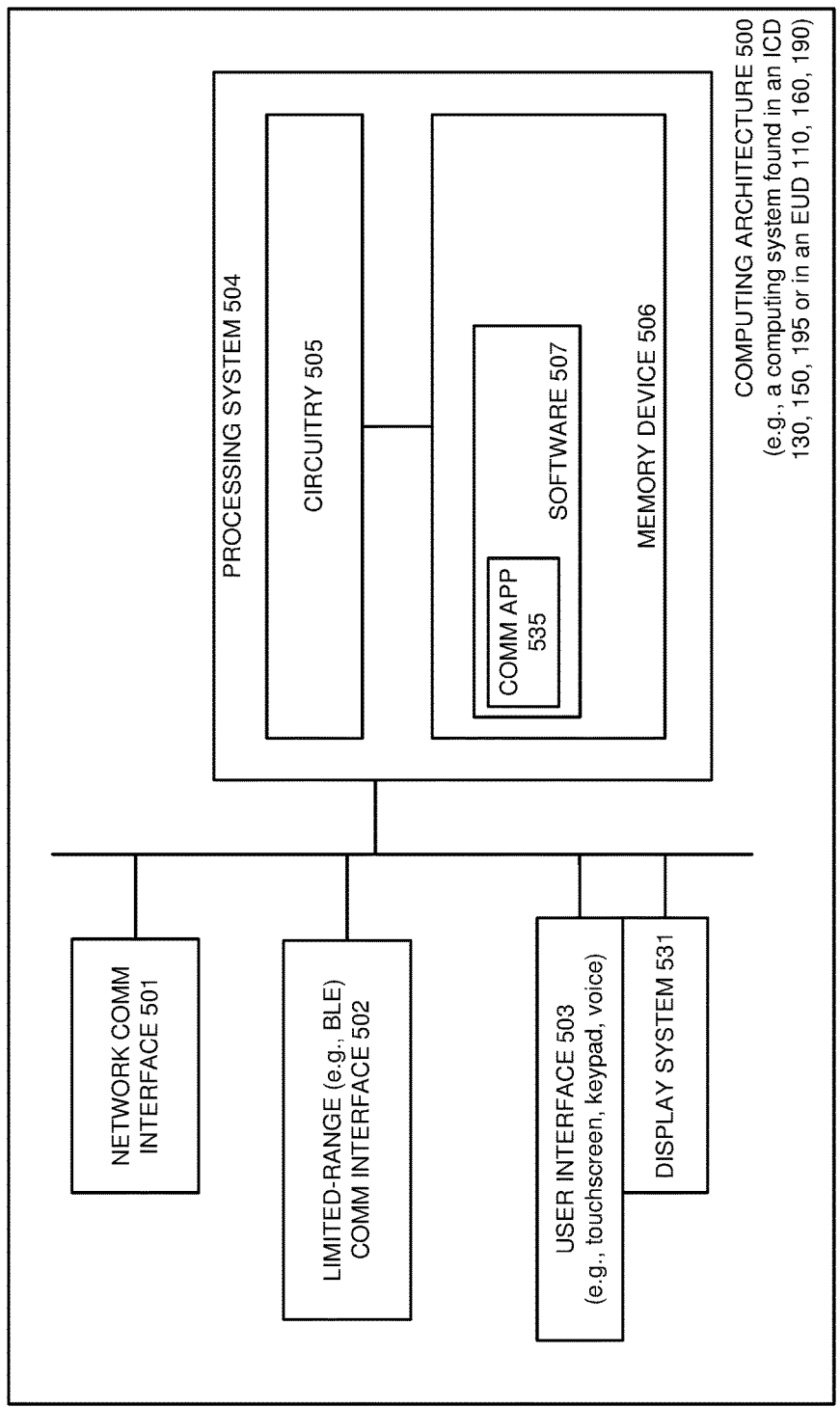
FIG. 5 illustrates a computing architecture of one or more components of a wearable group communication system including end user devices that provide one-touch transmission and one-touch silencing.

FIG. 5 illustrates a computing architecture 500 (or "computing system") to implement the communication systems, devices, apparatus and processes in the Figures and/or described herein (non-limiting examples of which include the end user devices and intermediate communication devices). Computing architecture 500 is representative of a computing architecture that may be employed in an intermediate communication device such as ICDs 130, 150, 195, or in any computing apparatus, system, or device, or collections thereof, to suitably implement one or more of the systems, devices, apparatus and processes in the Figures. Computing architecture 500 comprises network communication interface 501, limited-range communication interface 502, user interface 503, and processing system 504. Processing system 504 is communicatively linked to communication interfaces 501, 502 and user interface 503. Processing system 504 includes processing circuitry 505 and memory device 506 that stores operating software 507 (including communication application 535).

Network communication interface 501 comprises components that communicate over network and related communication links (e.g., including those extending outside a communication node), such as network cards, ports, RF transceivers, processing circuitry and software, or some other communication devices. Network communication interface 501 may be configured to communicate over metallic, wireless, or optical links. Network communication interface 501 also may be configured to use TDM, IP, Ethernet, optical networking, wireless protocols, communication signaling, or some other communication format—including combinations thereof. Limited-range communication interface 502 comprises components that communicate using a limited-range channel (e.g., Bluetooth low energy). User interface 503 comprises components that permit user interaction with computing architecture 500. User interface 503 can include a touchscreen, keyboard, display screen, voice command apparatus, mouse, touch pad, and/or other user input/output apparatus.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 may include any number of software modules to provide the communication operations described herein. Operating software 507 may further include an operating system, utilities, drivers, network interfaces, applications, or some other type of software. When executed by circuitry 505, operating software 507 directs processing system 504 to operate computing architecture 500 as described herein to provide one or more implementations of optical symbol sequence communication linking and other communications. Also connected to the processing system 504 and interfaces 501, 502 in some implementations is a display system 531 (which may be the same or included in the user interface 503).

In some implementations, each end user device can be implemented in a half-duplex type of operational mode. That is, a device in a communication node linked to a communication group or the like can transmit and receive, but cannot do both at the same time. A "push-to-talk" operational mode (e.g., as described herein with regard to a one-touch audio transmission implementation) allows an end user to utilize a transmit toggle or the like (e.g., by pushing and holding face 111 of device 190 as depicted by arrows 126A and 126B in FIGS. 2C and 2D) to initiate and terminate sending a voice communication to one or more users in the communication group. While the toggle is in its "transmit" position (e.g., with face 111 depressed), the end user device is configured to collect acoustic signals and convert them to audio data from the user (e.g., recording voice communications). This can be done in a variety of ways. The collected audio data can be held in the end user device or in a linked intermediate communication device (e.g., a smartphone, cellphone, gaming device, tablet, or laptop). When the toggle is switched back to its "receive" position, any collected audio data is transmitted to the one or more communication group members. The collected audio data can be transmitted using any appropriate transmission scheme. In one non-limiting example discussed below, audio data collected by an end user device can be transmitted to its linked intermediate communication device (e.g., via one of the Bluetooth modes). Likewise, audio data collected by an intermediate communication device can be send over a broader network using any appropriate communication protocol or scheme.

Figure 6A:
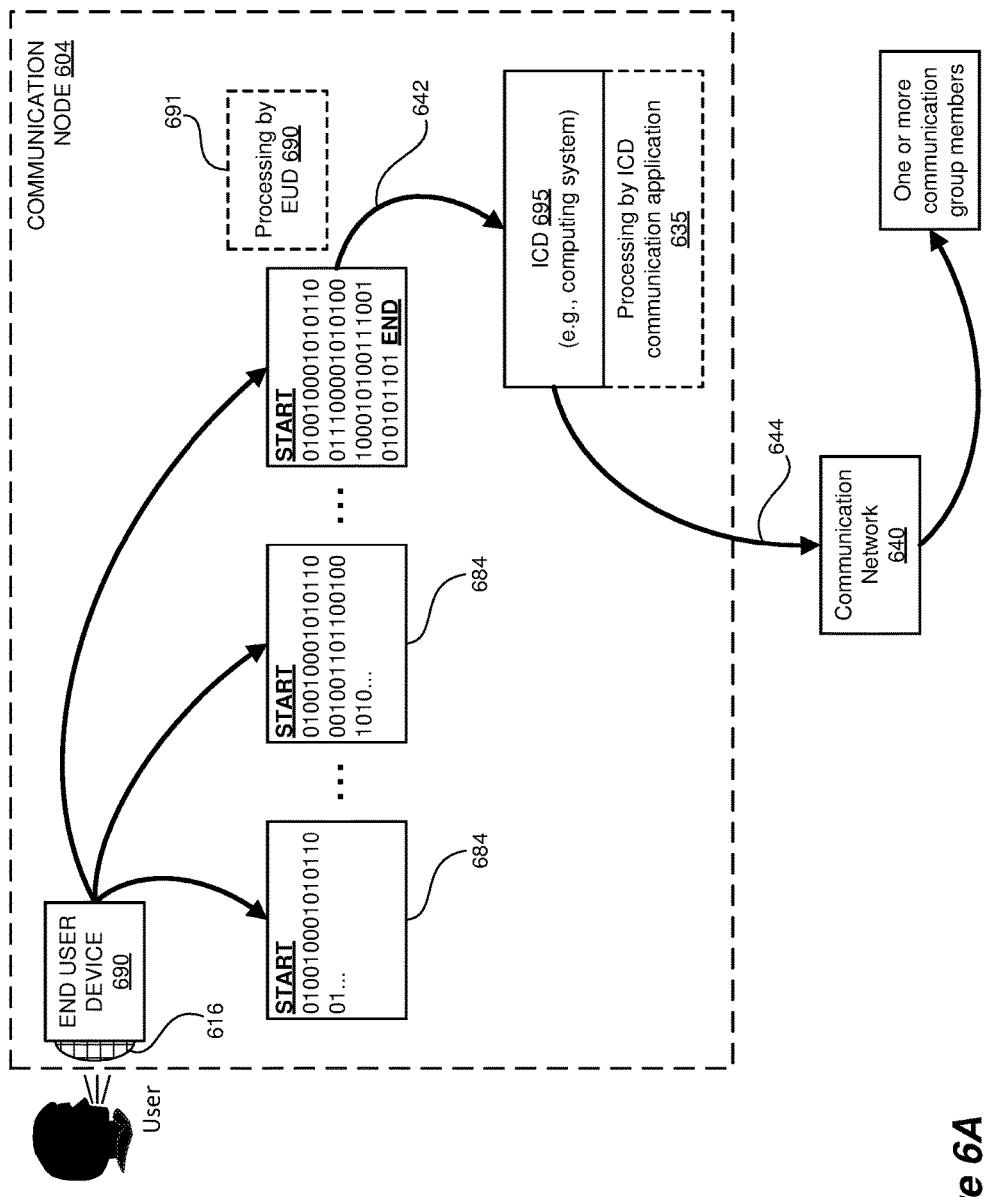
FIG. 6A illustrates operation of a communication node.

In one implementation, a non-limiting example of which is illustrated in FIG. 6A, a communication node 604 includes an end user device 690 that has a microphone 616 configured to collect audio data from a human user. As illustrated in FIG. 6A, the end user device 690 begins storing the collected audio data in a memory location 684. This audio data collection process continues until the a push-to-talk button on end user device 690 is released (i.e., the END signal in FIG. 6A). Some additional processing 691 may be performed by end user device 690 before the collected audio data is transmitted at 642 to an intermediate communication device 695 that also is part of communication node 804. Again, some additional processing 635 may be performed by ICD 697 before it transmits at 644 the audio data to one or more additional communication group members via communication network 640. In some implementations, multiple members of a group can be collecting audio data, though while an EUD 690 or the like is collecting such audio data (i.e., while the push-to-talk button is in its transmit position) the ICD 695 and/or EUD 690 cannot play back audio data received from another user.

Figure 6B:
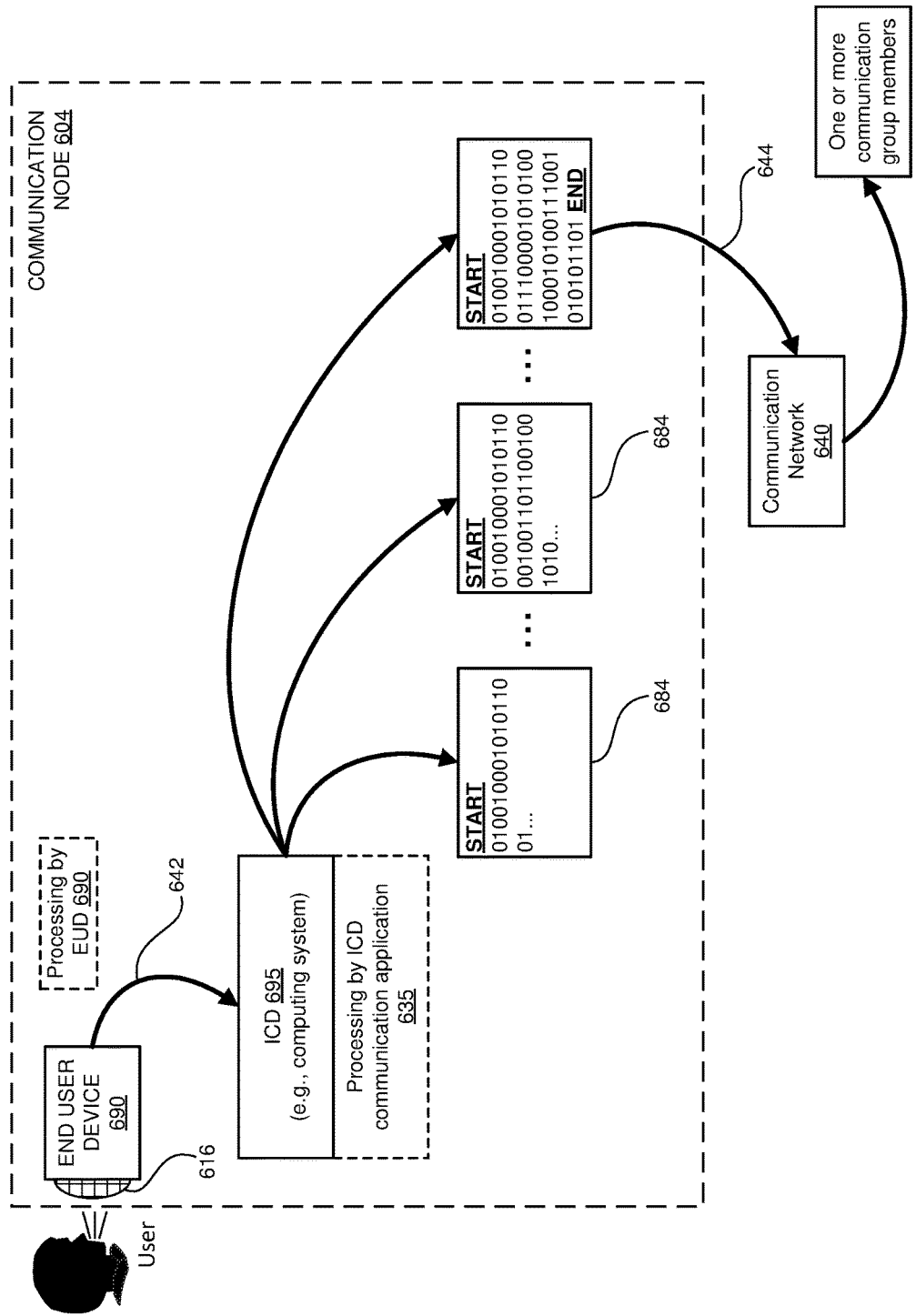
FIG. 6B illustrates operation of a communication node.

In another non-limiting example shown in FIG. 6B, it is the intermediate communication device 695 that stores the collected audio data before it is transmitted via network 640. The end user device 690 may process audio data collected from a user prior to transmission at 643 to the ICD 695 (e.g., the collected audio data may be encrypted, buffered to permit error correction, assembled into packets, etc.). The intermediate communication device 695 builds the audio data until the push-to-talk button on the EUD 690 is switched back to receive, at which point the ICD 695 can transmit the collected audio data to network 640 and thus to one or more communication group members or the like.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A communication device comprising:
a housing comprising:
a body comprising a speaker and a microphone; and
a cover coupled to the body, wherein the cover extends to cover substantially all of an upper portion of the body;
wherein the cover is rotatable relative to the body between a first position and a second position;
wherein bidirectional communication using the speaker and microphone is enabled when the cover is in the first position;
wherein at least the speaker is silenced when the cover is in the second position; and
wherein the communication device generates a haptic signal when the cover is in the second position in lieu of audio that would otherwise be broadcast.

2. A communication device comprising:
a housing comprising:
a body comprising a speaker and a microphone; and
a cover coupled to the body,
wherein the cover extends to cover substantially all of an upper portion of the body;
wherein the cover is rotatable relative to the body between a first position and a second position;
wherein the cover comprises an optical display, wherein the optical display presents a first visually perceptible confirmation when the cover is in the first position and a second visually perceptible confirmation when the cover is in the second position;
wherein bidirectional communication using the speaker and microphone is enabled when the cover is in the first position;
wherein at least the speaker is silenced when the cover is in the second position; and
wherein the optical display is positioned on the cover so that the optical display points to a first housing marker when the cover is in the first position and further wherein the optical display points to a second housing marker when the cover is in the second position.

3. A communication device comprising:
a housing comprising:
a body comprising a speaker and a microphone; and
a cover coupled to the body;
an attachment mechanism;
wherein the cover extends to cover substantially all of an upper portion of the body;
wherein the cover is rotatable relative to the body between a first position and a second position;
wherein the cover comprises an optical display, wherein the optical display presents a first visually perceptible confirmation when the cover is in the first position and a second visually perceptible confirmation when the cover is in the second position;
wherein bidirectional communication using the speaker and microphone is enabled when the cover is in the first position;
wherein at least the speaker is silenced when the cover is in the second position;
wherein the optical display is positioned on the cover so that the optical display points to a first housing marker when the cover is in the first position and further wherein the optical display points to a second housing marker when the cover is in the second position; and
wherein the first housing marker is a first portion of the attachment mechanism and further wherein the second housing marker is a second portion of the attachment mechanism.

4. A communication device comprising:
a housing comprising:
a body comprising a speaker and a microphone; and
a cover coupled to the body, wherein the cover is movable relative to the body between a raised position relative to the body and a depressed position relative to the body and further wherein the cover extends to cover substantially all of an upper portion of the body;
wherein the device is enabled to collect and transmit audio data when the cover is in the depressed position relative to the body and further wherein the microphone is disabled from collecting and transmitting audio data when the cover is in the raised position relative to the body.

5. The communication device of claim 4 wherein further wherein the communication device provides a confirmation signal when the cover moved between the raised and depressed positions.

6. The communication device of claim 4 wherein the cover comprises an optical display, wherein the optical display presents a first visually perceptible confirmation when the cover is in the raised position and a second visually perceptible confirmation when the cover is in the depressed position.

7. The communication device of claim 6 wherein optical display comprises a plurality of light-emitting diodes (LEDs) and further wherein each visually perceptible confirmation comprises a colored LED animation.

8. An endpoint communication device comprising:
a housing comprising:
a body comprising a speaker and a microphone;
a cover coupled to the body, wherein the cover extends to cover substantially all of an upper portion of the body; and
wherein the endpoint communication device is configured to be linked to an intermediate communication device to comprise a communication node enabling communications to and from the endpoint communication device;
wherein the cover is rotatable relative to the body between a first position and a second position about a rotational motion axis extending linearly through the body and the cover;
further wherein the cover is depressible relative to the body between a raised position and a depressed position along a linear motion axis extending linearly through the body and the cover;
further wherein bidirectional communication using the speaker and microphone is enabled when the cover is in the first position and further wherein at least the speaker is silenced when the cover is in the second position; and
further wherein the device is enabled to collect and transmit audio data when the cover is in the depressed position and further wherein the microphone is disabled from collecting and transmitting audio data when the cover is in the raised position.

9. The communication device of claim 8 further wherein the communication device provides a confirmation signal when the cover is rotated from one position to the other.

10. The communication device of claim 8 wherein the cover comprises an optical display, wherein the optical display presents a first visually perceptible confirmation when the cover is in the first position and a second visually perceptible confirmation when the cover is in the second position.

11. The communication device of claim 10 wherein optical display comprises one or more light-emitting diodes (LEDs) and further wherein each visually perceptible confirmation comprises a colored LED animation.

12. The communication device of claim 8 wherein the communication device generates a haptic or light pulsation signal when the cover is in the second position in lieu of audio that would otherwise be broadcast.

13. The communication device of claim 9 wherein the confirmation signal comprises one of the following: an audio tone, a blinking light, or a haptic vibration.

14. The communication device of claim 8 wherein the intermediate communication device comprises one of the following: a cellphone, a smartphone, a gaming device, a tablet or a laptop.

15. The communication device of claim 8 further wherein the communication device provides an audible signal when the cover is moved to its depressed position.

16. The communication device of claim 8 wherein the rotational motion axis and the linear motion axis are collinear.

* * * * *